(12) United States Patent
Bruch (10) Patent No.: US 9,731,910 B2
(45) Date of Patent: Aug. 15, 2017

(54) FORMATTING PART FOR GUIDING CONTAINERS IN A CONTAINER TREATMENT INSTALLATION

(71) Applicant: KHS GmbH, Dortmund (DE)

(72) Inventor: Bernd Bruch, Weinsheim (DE)

(73) Assignee: KHS GmbH, Dortmund (DE)

( * ) Notice: Subject to any disclaimer, the term of this patent is extended or adjusted under 35 U.S.C. 154(b) by 23 days.

(21) Appl. No.: 14/893,799

(22) PCT Filed: Apr. 19, 2014

(86) PCT No.: PCT/EP2014/001079
§ 371 (c)(1),
(2) Date: Nov. 24, 2015

(87) PCT Pub. No.: WO2014/191072
PCT Pub. Date: Dec. 4, 2014

(65) Prior Publication Data
US 2016/0107845 A1    Apr. 21, 2016

(30) Foreign Application Priority Data
May 27, 2013    (DE) .................. 10 2013 105 431

(51) Int. Cl.
B65G 21/20    (2006.01)
B65G 21/00    (2006.01)
B65G 47/84    (2006.01)
B65G 47/74    (2006.01)

(52) U.S. Cl.
CPC ....... *B65G 47/846* (2013.01); *B65G 21/2072* (2013.01)

(58) Field of Classification Search
None
See application file for complete search history.

(56) References Cited

U.S. PATENT DOCUMENTS 6,305,528 B1 * 10/2001 Leonard ............. B65G 21/2072
198/836.3

FOREIGN PATENT DOCUMENTS

| | | | |
|---|---|---|---|
| DE | 272274 A1 * | 4/1989 | ............. B65G 21/20 |
| DE | 272 274 | 10/1989 | |
| DE | 93 03 027 | 4/1993 | |
| DE | 9303027 U1 * | 4/1993 | ......... B65G 21/2072 |
| FR | 2 950 040 | 3/2011 | |

* cited by examiner

*Primary Examiner* — Kavel Singh
(74) *Attorney, Agent, or Firm* — Occhiuti & Rohlicek LLP (57) ABSTRACT

A formatting part for guiding containers in a container treatment installation includes first and second formatting part elements spaced apart along a first direction with an adjustable gap between them. Adjusting the gap between them causes a container guide rail to move an and out along a second direction perpendicular to the first to permit adjustment for different kinds of bottles.

15 Claims, 10 Drawing Sheets

FORMATTING PART FOR GUIDING CONTAINERS IN A CONTAINER TREATMENT INSTALLATION

RELATED APPLICATIONS

This application is the national stage, under 35 USC 371, of international application PCT/EP2014/001079, filed on Apr. 19, 2014, which claims the benefit of the May 27, 2013 priority date of German application DE 10 2013 105 431.5, the contents of which are herein incorporated by reference.

FIELD OF INVENTION

The invention relates container-treatment installations, and in particular, to guiding containers through such installations.

BACKGROUND

Container treatment installations comprise guide elements that are arranged to guide the containers through the installation. In most cases, the guide units will guide the containers through the installation from one processing station to the next. For example, a guide unit might guide a container from a filling station to a labeling station. These guide units are generally customized to the container being guided. In particular, the guide unit accommodates such container characteristics as container shape, weight, and/or size.

Since a container-treatment installation would be expected to handle different containers, the container guide must be arranged to match the different container sizes, the most significant being container height and the container diameter. For example, the ideal contact point between a container guide and a short bottle is perceptibly lower than the corresponding ideal contact point on a tall bottle. One way to achieve this is to have interchangeable parts.

Storing different parts for different containers is burdensome because one must acquire and store so many different parts. In addition, the labor associated with exchanging parts is time-consuming. This results in machine down-time and lost production.

SUMMARY

An object of the invention is that of providing a formatting-part with which different container sizes can be reliably guided through a container-treatment installation.

In one aspect, the invention features an apparatus for guiding containers in a container-treatment installation. Such an apparatus includes a formatting-part having first and second formatting-part-elements that are separated from each other along a first direction so that the separation defines a gap having an adjustable gap width. These formatting-part-elements connect to a guide-device that is configured so that adjusting the gap width adjusts a container guide-rail along a direction perpendicular to the first direction. A first joint-element connects the first joint-carrier to the first formatting-part-element and a second joint-element connects the second joint-carrier to the second formatting-part-element. Both joint-carriers connect to the connection-joint in a jointed fashion so that they can articulate about the connection-joint.

Some embodiments include a third formatting-part-element and a second guide-device. In these embodiments, the third formatting-part-element is separated from the second formatting-part-element by a second gap that also has an adjustable width. The second guide-device connects to the second formatting-part-element and also to the third formatting-part-element.

Other embodiments include a third formatting-part-element separated from the second formatting-part-element by a second gap that also has an adjustable width. In these embodiments, the third joint-element connects the second formatting-part-element to the third joint-carrier, and the fourth joint-element connects the third formatting-part-element to the fourth joint-carrier. Both the third and fourth joint-carriers are connected in jointed fashion to the second connection-joint so that they can articulate about the second connection-joint.

Other embodiments include a third joint-carrier that is parallel to the first joint-carrier, and a fourth joint-carrier that is parallel to the second joint-carrier.

In yet other embodiments, the first connection-joint comprises a rail carrier for guiding the first container-guide-rail.

Also among the embodiments are those that have first and second rail-carriers and a second container-guide-rail. In these embodiments, the first connection-joint comprises the first and second first rail-carriers that guide the first and second container-guide-rails respectively.

Other embodiments include those in which first and second rail-carriers are arranged in a horizontal plane with a spatial interval therebetween. In these embodiments, the first container-guide-rail is arranged in a displaceable manner in the first and second rail-carriers.

Also among the embodiments are those in which the first guide-device is narrower in a middle region opposite a connection region of the first guide-device at the first formatting-part-element.

In another aspect, a formatting-part for the guiding of containers in a container-treatment installation includes parallel first and second formatting-parts separated from each other by an adjustable gap. The term "adjustable" is understood to mean that the extent of the gap between the formatting-parts can be changed without having to dismantle them. Throughout this specification, the term "perpendicular spacing" shall be construed to mean the extent of this gap.

The formatting-part elements, which form the formatting-part, are arranged one above the other in a manner analogous to building stories. The gap separates the two planes occupied by the two formatting-part elements. The extent of this gap depends on the bottle size that is to be transported.

Because the gap is adjustable, one formatting-part can be used for a plurality of different containers with different sizes and shapes. As a result, it is possible to eliminate the time-consuming exchange of parts that delayed the changeover of a container-processing machine to accommodate different elements.

In some embodiments, adjustment of the formatting-parts in relation to one another can be carried out with a mechanical drive, such as a spindle drive, or by an electrical, pneumatic, or hydraulic drive. In addition, it can be carried out manually. For example, by turning a crank.

According to a further embodiment of the invention, the formatting-part includes a guide-device connected to the first and second formatting-part elements. The guide-device guides containers using a container guide-rail that is adjustable along a direction that is transverse to the perpendicular spacing of the formatting-part elements.

Also among the embodiments are those in which a container guide-rail adjusts in and out along a radial direction, with the adjustment being a function of the type of container to be guided.

Also among the embodiments are those in which various actuating devices can be used to change the perpendicular spacing between the formatting-parts. These actuating devices include a hand crank, an electrically powered actuator, and a pneumatically powered actuator.

The guide-device is arranged in such a way that at least sections of it project over an outer edge of the formatting-part elements or over an edge of the formatting-part.

In some embodiments, the container guide-rail's direction of movement is perpendicular to the direction in which the two formatting-part elements move. In other embodiments, the container guide-rail's direction of movement is 90 degrees relative to the direction in which the two formatting-part elements move. In other embodiments, in response to a change in the perpendicular spacing, the container guide-rail undergoes a movement transverse to the perpendicular spacing of the formatting-part elements. And in yet other embodiments, the container guide-rail moves in a direction that is orthogonal to the direction in which the two formatting-part elements move.

The container guide-rail is therefore movable along a horizontal plane of the container-treatment installation, while the formatting-part elements are adjustable along a vertical plane of the container-treatment installation. The adjustability of the container guide-rail allows the formatting-part to easily adjust to different container thicknesses. As a result, only one formatting-part is needed to guide containers with different diameters.

In some embodiments, the guide unit is arranged so that adjusting the perpendicular spacing between the formatting-part elements simultaneously adjusts the container guide-rail.

In other embodiments, a coupling exists between the movement transverse to the perpendicular spacing and movement along the perpendicular spacing. Among these embodiments are those in which the container guide-rail moves toward the outer edge of the formatting-part when the spacing increases and moves the other way as the spacing decreases.

Embodiments include those in which the guide-device has two jointed elements and a connection-joint. Some of these embodiments use conventional joint or hinge elements both for the joint-elements as well as for the connection-joint. Other embodiments use film hinges.

In some embodiments, the container guide-rail's direction of movement is normal to the direction in which the two formatting-part elements move. In other embodiments, the container guide-rail moves in a direction that is transverse to the direction in which the two formatting-part elements move.

According to a further embodiment of the invention, the guide-device comprises two joint-carriers. A first joint-element arranged at the first joint-carrier connects to the first formatting-part element, a second joint-element arranged at the second joint-carrier connects to the second formatting-part element, and the first and second joint-carriers connect in a jointed or articulating fashion to the connection-joint.

Embodiments include those in which a joint's basic body has two movable joint or hinge connections. In these embodiments, a first jointed connection is formed at the connection-joint with the first joint-carrier, and a second jointed connection is formed with the second joint-carrier.

In some embodiments, the connection-joint is a container guide-rail. In others, the connection-joint engages the container guide-rail. In either case, the result is that bottles are guided through the container-treatment installation using the connection-joint or the container guide-rail arranged at the connection-joint.

The three-jointed guide-device is simple to construct and user-friendly. It also makes it possible to simultaneously adjust the two formatting-parts in relation to one another, and to thus adjust the distance from the container guide-rail to the outer edge of the formatting-part.

With particularly tall containers, it may be necessary to arrange two or more container guide-rails against the container's side to more securely support the container. To achieve this, some embodiments feature a third formatting-part element separated from the second formatting-part element, and a second guide-device connected to the second and third formatting-part elements. The perpendicular spacing between the second and third formatting-part element is adjustable.

The third formatting-part element can be arranged in relation to the second formatting-part element in the same way that the second formatting-part element is arranged in relation to the first formatting-part element. The first, second, and third formatting-part elements are therefore arranged one on top of the other in the form of building stories. In particular, the three formatting-part elements would define a structure not unlike a two-story building in which the floor-to-ceiling heights of each story are adjustable.

The adjustability of the third formatting-part element can either depend or be independent of the adjustability between the first and second formatting-part elements. It is therefore possible, for example, for the adjustment of the second and third formatting-part elements to be carried out by a common adjustment device. It is also possible to have a separate adjustment device for each adjustable spacing interval. In such a case, the space between the first and the second formatting-part elements can be different from the space between the second and third formatting-part elements.

In some embodiments, the second guide-device is arranged so that it corresponds to the first guide-device and thus does whatever the first guide-device does. In this embodiment, the second guide-device, like the first, is adjustable in a direction that is perpendicular to the a plane defined by the second and third formatting-part elements.

In other embodiments, the second guide-device is arranged to be adjusted independently of the adjustability of the first guide-device. These embodiments are useful to accommodate bottles whose shape is such that the bottle's diameter varies as a function of location along the bottle's axis. For example, a bottle with a narrow neck has a wide diameter at its belly but a narrower diameter as one approaches the neck. When the two guide-devices are independently adjustable, it is possible to move one guide device further towards the bottle's axis to engage the neck or shoulder while leaving the other guide device further from the bottle's axis so that it can engage the wider belly.

A particularly simple, economical, and low-maintenance formatting-part has a second guide-device that has, in addition to the first and second joint-carriers, a third joint-carrier connected to the second formatting-part element with a third joint-element, and a fourth joint-carrier connected with a fourth joint-element to the third formatting-part element. The third and fourth joint-carriers connect in jointed fashion to the second connection-joint.

The second guide-device can therefore be arranged in a manner corresponding to the first guide-device. Because the same parts are used, this embodiment is particularly economical for manufacturers since fewer kinds of parts need to maintained in inventory, and also for the users of the container-treatment installation who need to maintain a spare-parts inventory with fewer species of parts.

In order to achieve a particularly reliable container guide arrangement, in particular one that has to guide heavy bottles, such as glass bottles, it is useful to provide a guide-device in which each joint-carrier has another joint-carrier parallel to it. This results in the formation of a pair of a parallelograms in which a pair of parallel sides is formed by a pair of parallel joint-carriers. The four corner angles of each parallelogram are a function of the spacing between the formatting-part elements.

To further improve the container guide system, there are embodiments with two or more rail carriers that are spaced apart from one another for guiding a container guide-rail. The rail carriers are spaced apart to form a gap therebetween such that two guide points engage a container at two different points along the axis of the container. This configuration achieves particularly high guide stability, especially when guiding heavy bottles, or when guiding containers through areas where guidance is difficult and precision movement of the bottles is necessary.

In some embodiments, the connection-joint has plural vertically spaced rail carriers extending longitudinally, i.e. in a perpendicular direction. In those embodiments that have joint-carriers arranged in parallelogram form, the connection-joint can also be formed so that it is shaped like a box.

Regardless of whether container transport is linear or rotational, a plurality of rail carriers can be arranged horizontally next to one another. As a result, a rail-type container guide-rail, along which the containers slide can be inserted into the rail carrier.

When the bottles have to go around a curve, the path's radius of curvature changes. This change is noticeable particularly with wider bottles. This means that the length of the container guide-rail must be adjusted according to the position of the rail carriers. Accordingly, in some embodiments, a plurality of rail carriers are arranged in a horizontal plane and spaced apart from each other. In these embodiments the container guide-rail is arranged in the rail carriers in a displaceable manner. This means that when the path's radius of curvature changes, the guide-rail can move to accommodate the change in curve radius. For this purpose, the container guide-rail is securely connected to the rail carriers located horizontally next to one another, while in the other rail carriers it is mounted so as to be capable of displacement.

In another embodiment, the guide-device is formed from a flexible material. The flexible material is connected to and extends between the first formatting-part element and the second formatting-part element. A suitable flexible material is a dimensionally stable flexible plastic, or rubber.

In some embodiments, when viewed in cross-section, the flexible material forms a bell-shaped projection between the two formatting-part elements. The bell is oriented such that the interior of the bell faces the formatting-part elements. The shape of the bell defines its camber.

In the region at which the bell connects to the formatting-part element, the flexible material defines a joint. This guarantees that, as the formatting-part elements move towards or away from each other, the camber's curvature changes accordingly. Thus, when the formatting-part elements move closer to each other, the camber's radius-of-curvature becomes smaller. This means that each point of the camber moves away from the outer edge of the formatting-part. Conversely, when the formatting-part elements move apart, the camber's radius-of-curvature becomes greater. This means that each point on the camber moves towards the outer edge of the formatting-part. The flexible material is therefore particularly well-suited for adapting the guide unit to bottles of different thickness.

The point of the camber that is furthest from the formatting-part is the camber's vertex. In some embodiments, the guide section is formed at this vertex of the bell-shaped flexible material. Thus, in operation, the vertex comes into contact with the respective container.

The flexible material does not need to be homogeneous. It can be composed of different materials at different locations. It is thus possible, for example to use a more rigid material where desirable. For example, it may be useful if the region at which the bell connects to the formatting-part elements is more rigid. Or it may be desirable to make the region near the guide section more rigid. However, a bell made with a homogeneous single piece of material is not without advantages. Such a bell would be durable and be easy to manufacture.

In rotational guide regions, in particular in transfer star elements with bottle projections, the flexible material can be adapted to the projections. For this purpose, a material section can be arranged in each projection. Advantageously, these material sections are wider at their connection regions with the formatting-part elements than they are about a region between the connection regions. Such a shape, being narrow in the middle, allows for particularly easy adjustment of the flexible material in the event of changes in the curve radius.

BRIEF DESCRIPTION OF THE DRAWINGS

These and other features of the invention will be apparent from the following detailed description and the accompanying figures, in which.

DETAILED DESCRIPTION

Figure 1A:
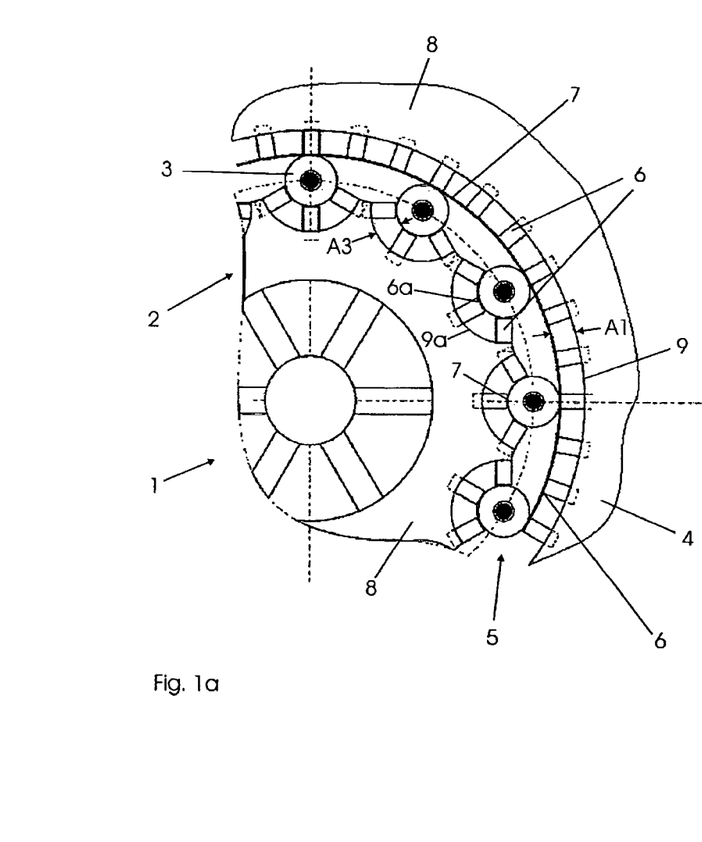
FIG. 1a shows a view from above a formatting-part designed as a transfer star element for the rotational transport of containers.
Figure 1B:
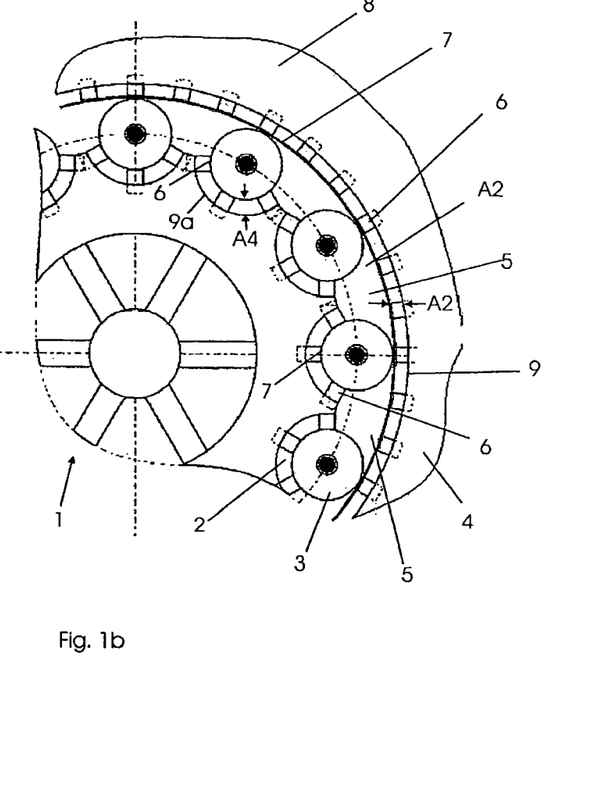
FIG. 1b shows the formatting-part of FIG. 1 but adjusted for the transport of bottles with a particularly large diameter.

FIGS. 1a and 1b show a first and second formatting-parts 1, 4 used in guiding containers 2. The first formatting-part 1 is a transfer star having projections 2 to accommodate containers 3. In the illustrated embodiment, these containers are bottles. The second formatting-part 4 is a ring section that corresponds to the shape of the first formatting-part 1.

For convenience of discussion, the center of the transfer star defines an axis of a cylindrical coordinate having an axial direction, a circumferential direction, and a radial direction.

The first and second formatting-parts 1, 4 define a curve guide unit having a guide channel 5 formed therebetween. It is through this guide channel 5 that containers 3 are guided through the container-treatment installation. FIG. 1a shows the curve guide unit adjusted for containers with small diameters. FIG. 1b shows the same curve guide unit for containers with large diameters.

Arranged at both the first and second formatting-part 1, 4 are one or more guide-devices 6. As the first formatting-part 1 transports containers 3, the containers 3 contact the one or more guide-devices 6.

FIGS. 1a, 1b further show a container guide-rail 7 arranged at the guide-devices 6 of the second formatting-part 4 as well as at the guide-devices 6 of the first formatting-part 1.

The first and second formatting-parts 1, 4 consist of an upper formatting-part element 8 and a lower formatting-part element below the upper formatting element 8. The lower formatting element is therefore not visible in FIGS. 1a and 1b.

FIG. 1a shows a first spacing A1 between the container guide-rail 7 and the first and second formatting-parts 1, 4. FIG. 1b shows a second spacing A2 between the container guide-rail 7 and the same formatting-parts 1, 4. As is apparent from inspection of the figures, the second spacing A2 is greater than the first spacing A1. As a result, in FIG. 1b, the container guide-rail 7 is closer an the outer edge 9 of the second formatting-part 4 than it is in FIG. 1a. As a result, the guide channel 5 is wider in FIG. 1b than it is in FIG. 1a and therefore suitable for containers with larger diameters.

FIG. 1a also shows a first distance A3 between a contact region 6a at which the guide-device 6 contacts a container and an outer edge 9a of the first formatting-part 1. FIG. 1b shows a corresponding second distance A4. As is apparent, the first distance A3 is also greater than the second distance A4.

Figure 2A:
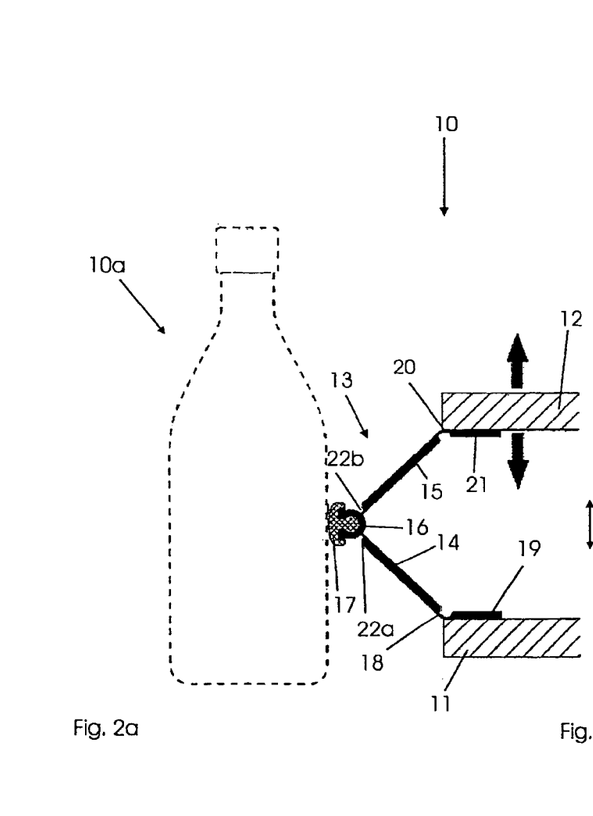
FIG. 2a is a cross-section of a formatting-part with a guide-device.

FIG. 2a shows a cross-section through a formatting-part 10 that has a first formatting-part element 11 and a second formatting-part element 12 arranged above the first formatting-part element 11 and separated by a gap C. Both the first and second formatting-part elements 11, 12 are coupled to a first guide-device 13.

The first guide-device 6 includes first and second joint-carriers 14, 15. The first joint-carrier 14 has a proximal end that connects to a first connection section 19 at the first formatting-part element 11 via a first film hinge 18 and a distal end that connects to a first joint-element 22a. Similarly, the second joint-carrier 15 has a proximal end that connects to a second connection section 21 at the second formatting-part element 12 via a second film hinge 20 and a distal end that connects to a second joint-element 22b. The first and second joint-elements 22a, 22b are, in turn, coupled to a first connection-joint 16 that supports a first container guide-rail 17.

Figure 2B:
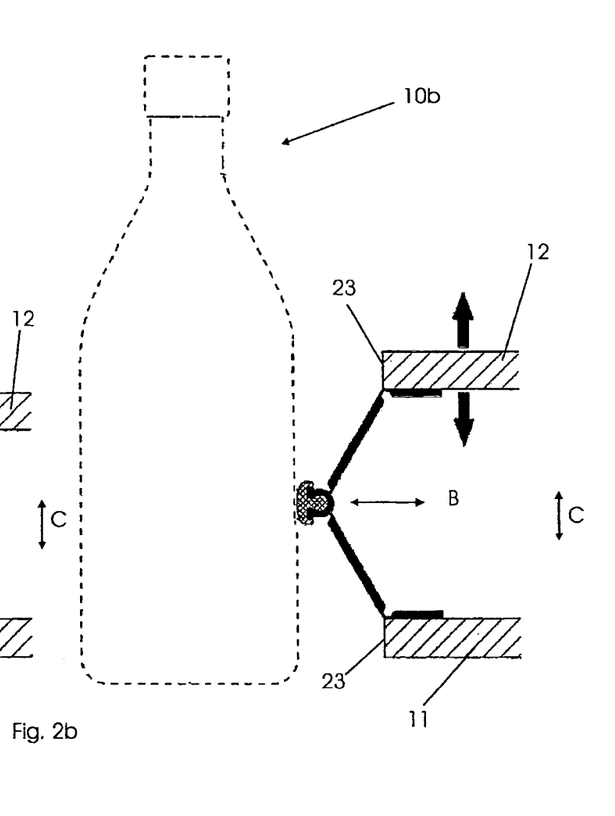
FIG. 2b is a cross-section of the embodiment from FIG. 2a, but adjusted for bottles with large diameter.

FIG. 2a further shows a narrow bottle 10a that is in contact with the first container guide-rail 17. FIG. 2b shows the formatting-part 10 from FIG. 2a but with the second formatting-part element 12 having been raised by a drive unit. As a result, the gap C between the first formatting-part element 11 and the second formatting-part element 12 has grown.

Because the gap C has grown, the connection-joint 16 has been displaced along a displacement direction B so that it is now closer to the outer edge 23 of the formatting-part 10. As a result, the guide channel 5, best seen FIGS. 1a and 1b, has become wider, thus making it possible to transport a wide bottle 10b.

Figure 3:
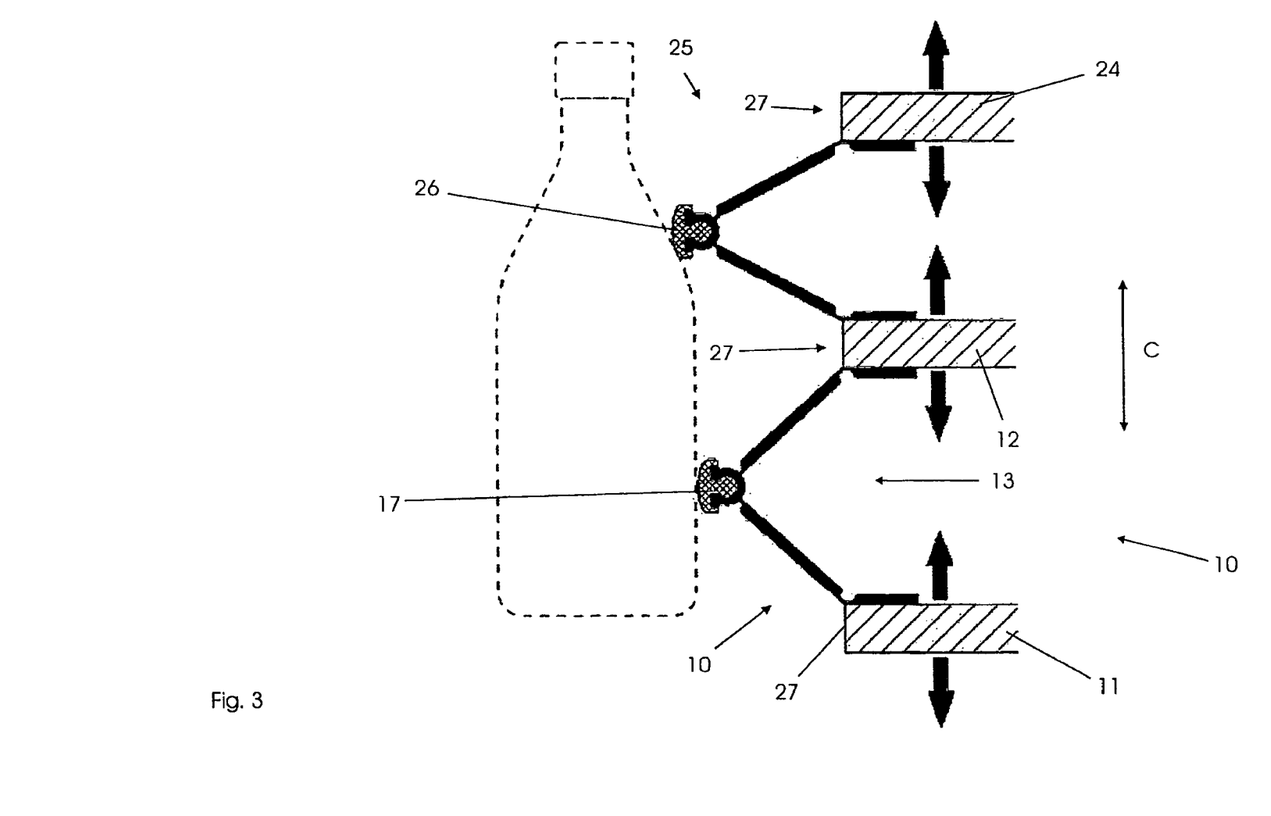
FIG. 3 is a cross-section of a formatting-part with three formatting-part elements and two guide-devices.

FIG. 3 shows an embodiment similar to that shown in FIGS. 2a, 2b but with a third formatting-part element 24 arranged above the second formatting-part element 12. A second guide-device 25 arranged between the second formatting-part element 12 and the third formatting-part element 24 has a structure and function similar to that of the first guide-device 6. The second guide-device 25 includes a second container guide-rail 26 whose position can be adjusted in the same manner as the first container guide-rail 17.

In the embodiment shown in FIG. 3, a first distance separates the first container guide-rail 17 and a line along the outer edges of the first, second, and third formatting-part elements. Similarly, a second distance separates the second container guide-rail 26 from the same line. A gap between the first formatting-part element 11 and the second formatting-part element 12 controls the first distance. Similarly, a gap between the second formatting-part element 12 and the third formatting-part element 24 controls the second distance. These gaps are determined by the vertical movement of the second formatting-part element 12 and the third formatting-part element 24. The vertical movements are independently controlled. As a result, the gaps, and hence the first and second distances, are also independently controlled.

Figure 4:
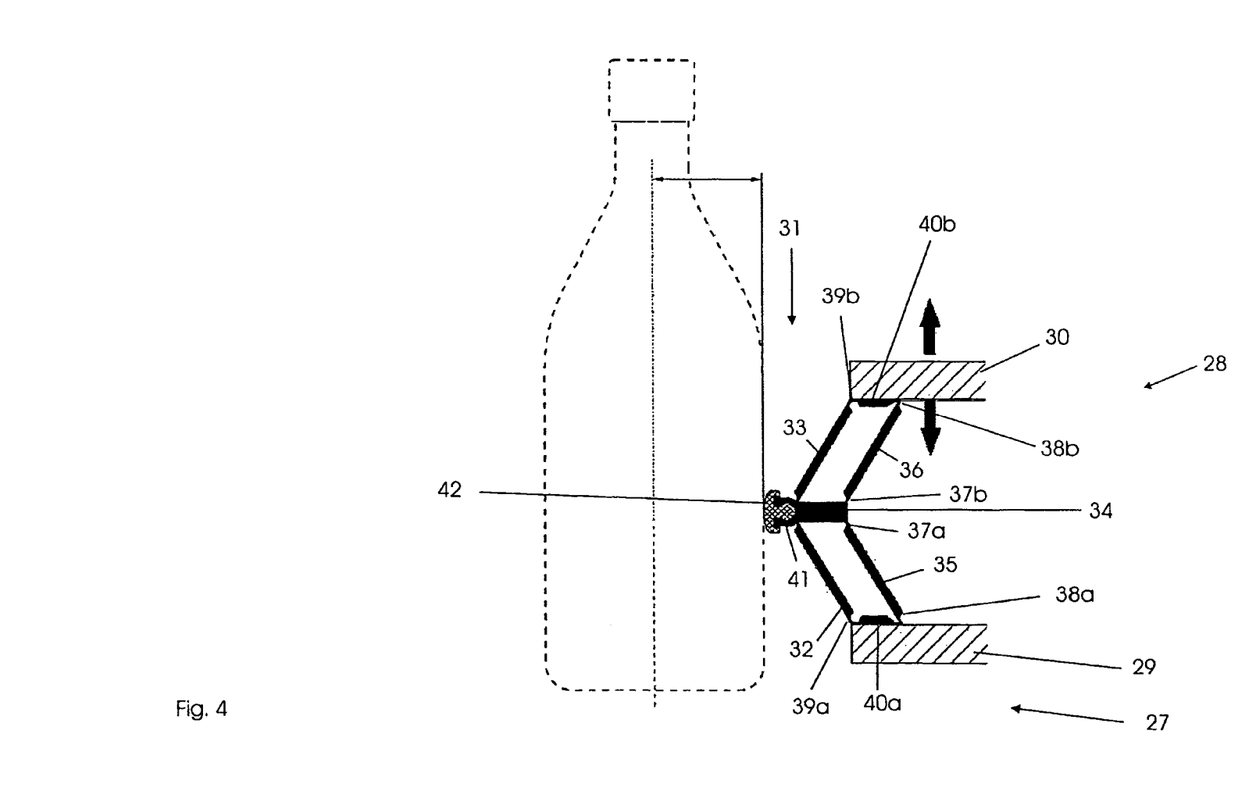
FIG. 4 is a cross-section of a formatting-part with joint-carriers arranged in a parallelogram.

FIG. 4 shows a particularly stable embodiment of a formatting-part 28 having first and second formatting-part elements 29, 30 and a guide-device 31 arranged therebetween.

The guide-device 31 comprises a first joint-carrier 32, a second joint-carrier 33, and a connection-joint 34 connecting the first and second joint-carriers 32, 33. The first and second joint-carriers 32, 33 correspond to the first and second joint-carriers 14, 15 shown in FIGS. 2a, 2b. These connect via corresponding film hinges 39a, 39b at corresponding first and second connections section 40a, 40b at the first and second formatting-part elements 29, 30.

In addition to the first and second joint-carriers 32, 33, the guide-device 31 also includes third and fourth joint-carriers 35, 36. The third joint-carrier 35 is parallel to the first joint-carrier 32; the fourth joint-carrier 36 is parallel to the second joint-carrier 33. Distal ends of the third and fourth joint-carriers 35, 36 connect in jointed fashion to the connection-joint 34 via first and second joint-elements 37a, 37b. Meanwhile, proximal ends of the third and fourth joint-carriers 35, 36 connect via corresponding third and fourth joint-elements 38a, 38b to the first and second formatting-part elements 39, 30 respectively.

The connection-joint 34 extends longitudinally in a radial direction from a first end to a second end. The first end of the connection-joint 34 defines a joint-carrier 41 that supports the container guide-rail 42. The second end is opposite the second end. The first and second joint-carriers 32, 33 connect to the connection-joint 34 at the first end. The third and fourth joint-carriers 35, 36 are offset radially and connect to the connection-joint 34 at the second end. The first and third joint-carriers 32, 35 thus define parallel sides of first parallelogram. Meanwhile, the second and fourth joint-carriers 33, 36 define parallel sides of a second parallelogram. The first and second parallelograms have a common side defined by the connection-joint 34. The first and second connection sections 40a, 40b form the remaining sides of the first and second parallelograms respectively.

Figure 5:
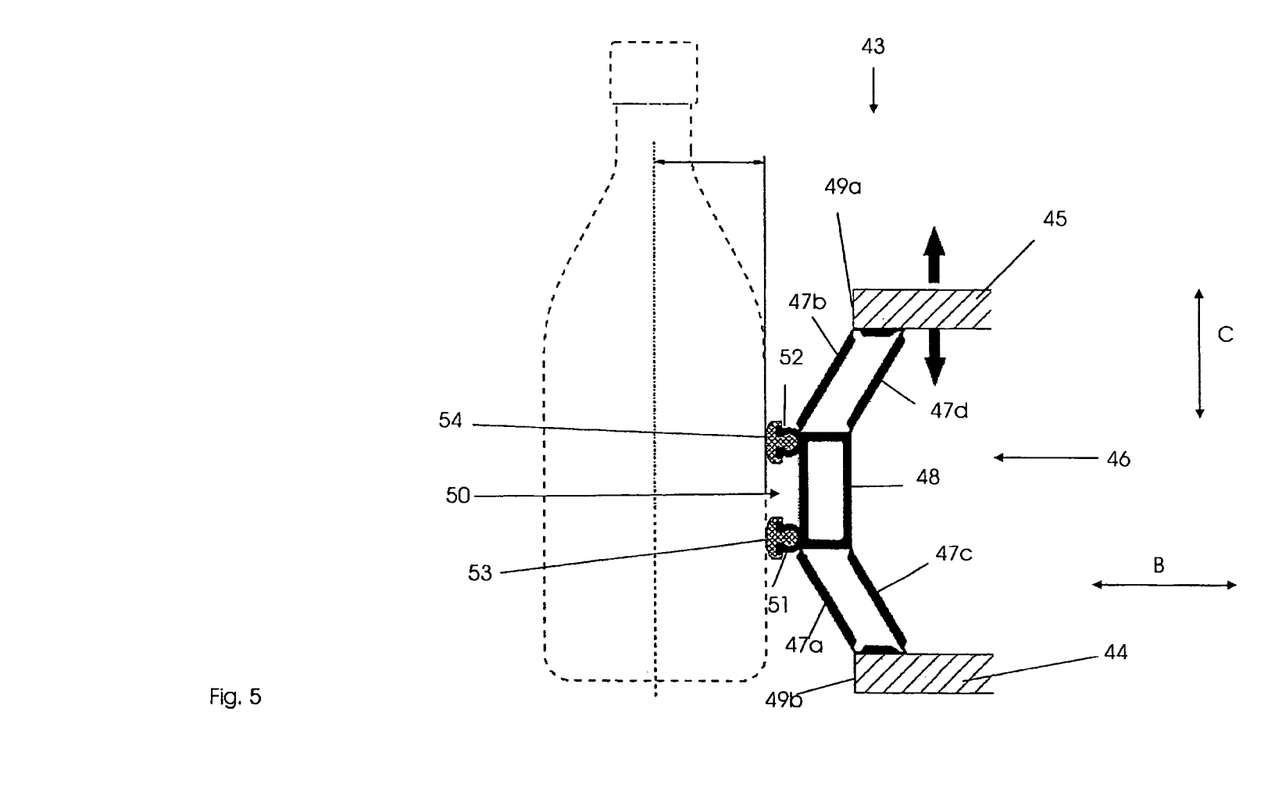
FIG. 5 is a cross-section of an embodiment similar to that shown in FIG. 4 but with two container guide-rails separated by a gap.

FIG. 5 shows a further embodiment of a formatting-part 43 that works much like the formatting-part shown in FIGS. 2a and 2b. The formatting-part 43 includes a guide-device 46 arranged between first and second formatting-part elements 44, 45 in a manner similar to the guide-device 31 shown in FIG. 4. The guide-device 46 features a first joint-carrier 47a having a distal end that connects to a connection-joint 48 and a proximal end that connects to a first formatting-part element 44, a second joint-carrier 47b having a distal end that connects to the connection-joint 48 and a proximal end that connects to a second formatting-part element 45, a third joint-carrier 47c having a distal end that connects to the connection-joint 48 and a proximal end that connects to a first formatting-part element 44, and a fourth joint-carrier 47d having a distal end that connects to the connection-joint 48 and a proximal end that connects to the second formatting-part element 45. The first and third joint-carriers 47a, 47c define opposite sides of a first parallelogram. The second and fourth joint-carriers 47b, 47d define opposite sides of a second parallelogram.

The connection-joint 48 has a rectangular cross-section that extends in both a radial direction B and an axial direction C. Arranged on an outer side 50 of the connection-joint 48 are first and second rail carriers 51, 52 spaced apart from one another in the vertical direction. The first rail carrier 51 supports a first container guide-rail 53 and the second rail carrier 52 supports a second container guide-rail 54 that is arranged above the first guide rail 52. This results in two contact surfaces, which provides a particularly secure guide for heavy containers, such as filled glass bottles.

Figure 6:
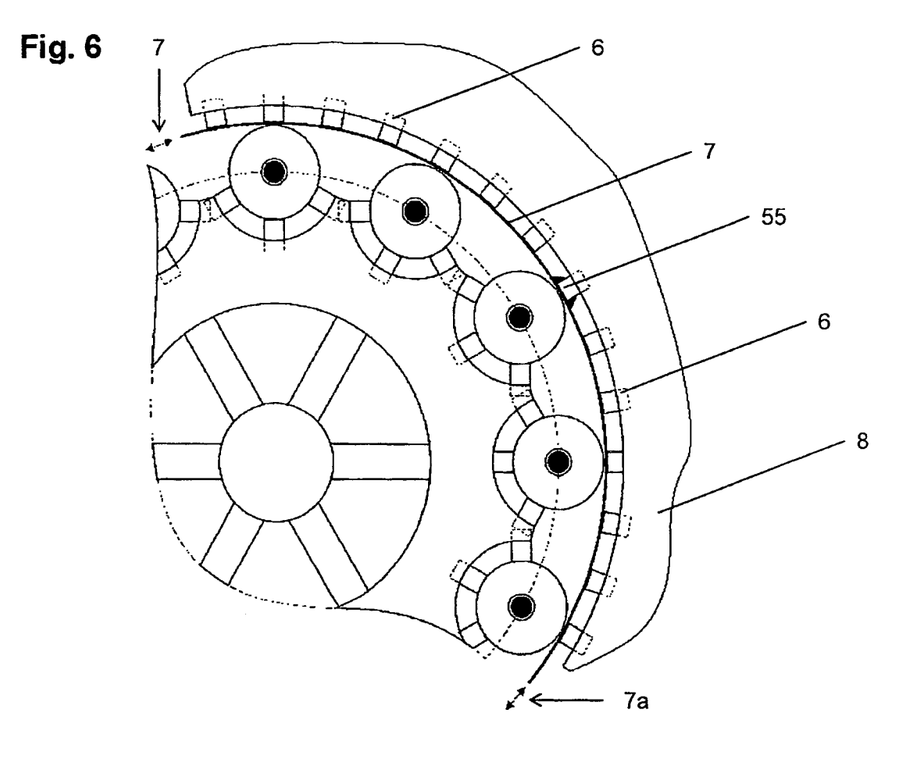
FIG. 6 is a view from above a formatting-part for rotational container transport with a displaceable container guide-rail.

FIG. 6 shows the second formatting-part 4 from FIGS. 1a and 1b in more detail. When the spacing between the upper formatting-part element 8 and the lower formatting-part element arranged beneath it changes, then the radius of the container guide-rail 7 also changes, as shown in FIGS. 2a and 2b. In order to achieve a flexible adjustment of the container guide-rail 7 as this spacing changes, the container guide-rail 7 is fixed securely to a rail carrier 55. As a result, when the spacing between the upper formatting-part element 8 and the lower formatting-part element changes, the container guide-rail 7 is automatically pushed along a direction 7a and into the rail carrier 55 and adjusted to the changed radius.

Figure 7:
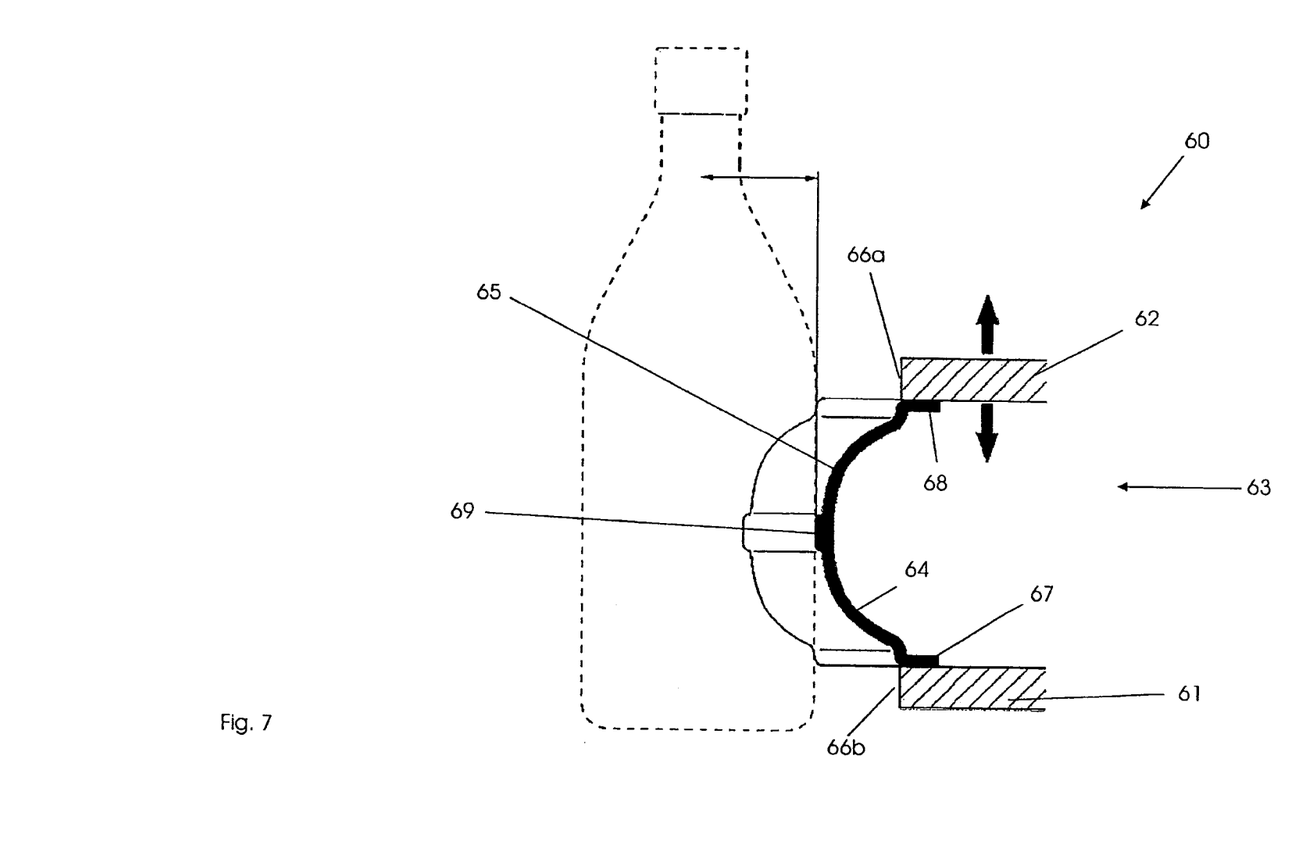
FIG. 7 is a cross-section representation of an embodiment of the formatting-part with a guide-device made of a flexible material.

FIG. 7 shows a formatting-part 60 with a first formatting-part element 61 and a second formatting-part element 62 offset from each other in the axial direction to form a gap. The extent of this gap is adjustable.

A guide-device 63 extends between the first and second formatting-part elements 61, 62. In the illustrated embodiment, the guide-device 63 is a bell-shaped diaphragm 64 having a cambered outer side 65 that points away from outer edges 66a, 66b of the first and second formatting-part elements 61, 62. A first free end 67 of the diaphragm connects to the first formatting-part element 61 and a second free end 68 of the diaphragm 64 connects to the second formatting-part element 62. The vertex of the cambered outer side 65 defines a guide section 69 that contacts containers. The diaphragm 64 itself is made from a flexible material, such as a rubber.

The formatting-part element 60 with its flexible diaphragm 64 functions in the same manner described in connection with embodiments of FIGS. 1a and 1b. A change in the extent of the gap between the formatting-part elements 61, 62 changes the bell-shaped camber of the diaphragm 64. Reducing this gap reduces the camber's radius and moves the guide section 69 of the diaphragm 64 away from the outer edges 66a, 66b. Increasing this gap increases the camber radius and moves the guide section 69 towards the outer edges 66a, 66b.

Figure 8:
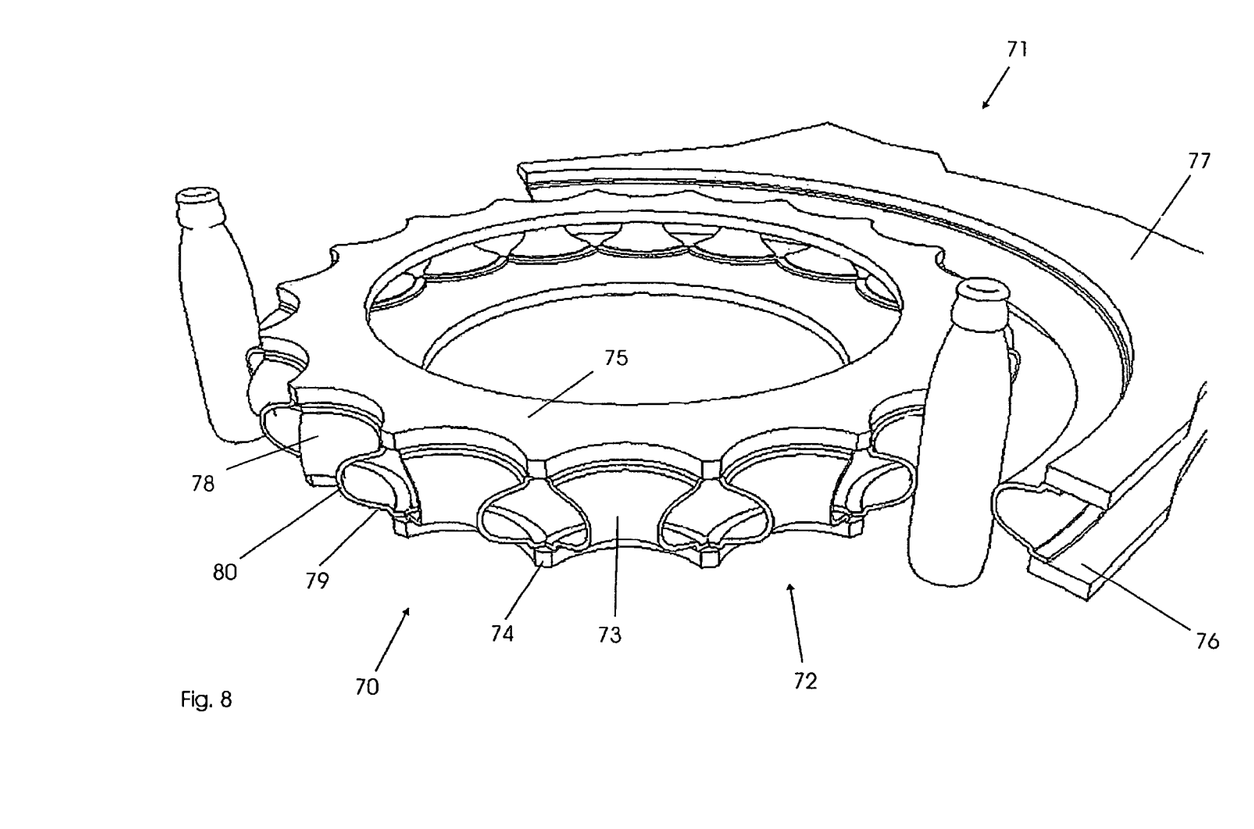
FIG. 8 is a perspective view of the formatting-part of FIG. 7.

FIG. 8 shows a perspective view of a first formatting-part 70 formed in a star shape for the rotational transport of bottles and an associated second formatting-part 71 formed as a section of a ring and partially surrounding the first formatting-part 70. The first formatting-part 70 has upper and lower formatting-part elements 75, 74. The second formatting-part 71 likewise has upper and lower formatting-part elements 77, 76.

Both the first and second formatting-parts 70, 71 correspond in cross-section to the embodiment in FIG. 7. The first formatting-part 70 has projections 72 for bottles. Arranged between the projections 72 are guide-devices 73 made of a flexible material, in this case rubber. The guide-devices 73 extend between upper and lower formatting-part elements 75, 74 of the first formatting-part 70.

When a change takes place in the gap between the upper formatting-part elements 75, 77 and the lower formatting-part elements 74, 76, the guide-device 73 forms a butterfly shape. In particular, a wide upper side 78 of the flexible guide-device 73 connects to the upper formatting-part element 75 and a wide underside 79 connects to the lower formatting-part element 74. This forms a narrow camber 80 between the upper side 78 and the underside 79.

Figure 9:
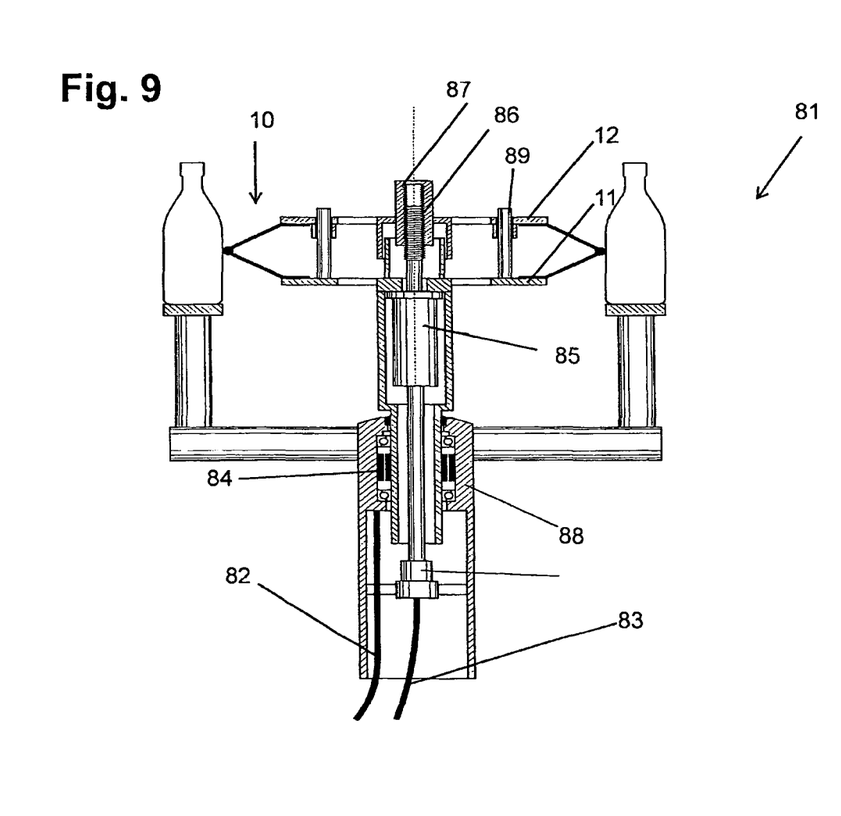
FIG. 9 is a sectional view of a transfer star element that features a motorized central adjustment of the space between formatting-part-elements.
Figure 10:
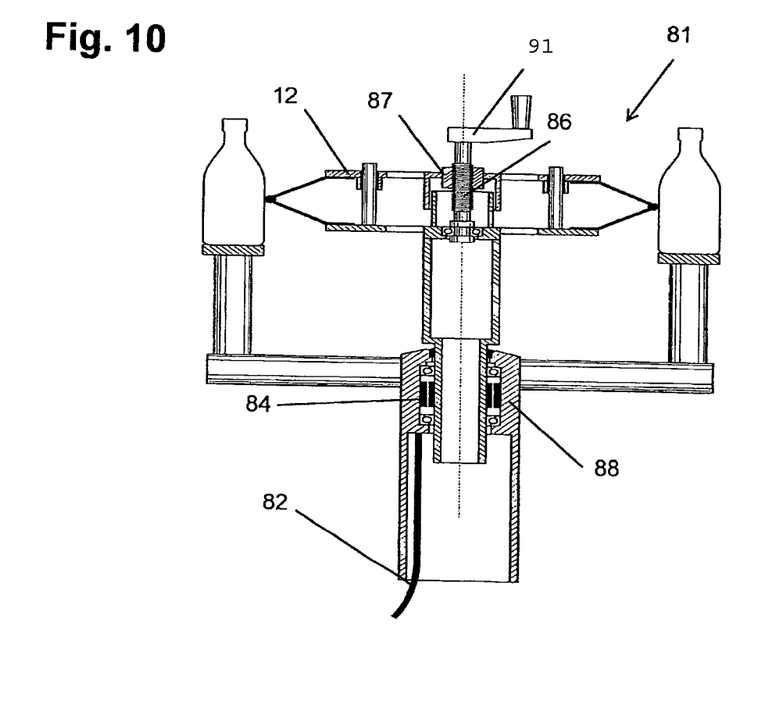
FIG. 10 is a sectional view of a transfer star element with a manual adjustment of the space between formatting-part-elements.

FIGS. 9 and 10 show sectional representations of a transfer star unit 81 having a central adjustment mechanism. In FIG. 9, the central adjustment is motor driven and in FIG. 10 it is manually driven. All the formatting-parts and guide-devices referred to and described heretofore are in principle suitable, possibly after minor adaptation, for either embodiment.

In both embodiments, a power cable 82 for the rotational drive 84 of the transfer star 81 passes through a central column 88. In the embodiment of FIG. 9, the central column 88 also accommodates a concentrically mounted central actuating drive 85. The actuating drive 85 drives a spindle 86 that extends from a proximal end of the actuating drive 85 to a distal end having an internal thread 87. This internal thread 87 connects to the second formatting-part element 12 such that rotating the spindle 86 raises and lowers the second formatting-part element 12. This, in turn, changes the radial coordinate of the container guide-rail 7. Guide pins 89 secured on the first formatting-part element 11 prevent the second formatting-part element 12 from rotating.

FIG. 10 shows a comparable transfer star 81 with the exception that the spindle 86 is a part of a hand crank 91 or can be connected to a hand crank 91 by means of a mating shape element. The internal thread 87 is, in turn, coupled to the second formatting-part element 12 in a manner analogous to that described in connection with FIG. 9.

Having described the invention, and a preferred embodiment thereof, what is claimed as new, and secured by Letters Patent is:

1. An apparatus for guiding containers in a container-treatment installation, said apparatus comprising a formatting part, wherein said formatting part comprises a first formatting-part-element, a second formatting-part-element, a first guide-device, a first container-guide rail, a first joint-element, a second joint-element, a first connection-joint, a first joint-carrier, and a second joint-carrier, wherein said second formatting-part-element is separated from said first formatting-part-element along a first direction, wherein said separation defines a first gap, wherein said first gap has an adjustable first-gap width, wherein said first guide-device is connected to said first and second formatting-part-elements, wherein said first guide-device comprises said first container guide-rail, said first and second joint-elements, said first and second joint-carriers, and said first connection-joint, wherein said first guide-device is configured such that adjustment of said first gap-width causes adjustment of said first container-guide-rail in a second direction, wherein said second direction is transverse to said first direction, wherein said first joint-element connects said first joint-carrier to said first formatting-part-element, wherein said second joint-element connects said second joint carrier to said second formatting-part-element, and wherein said first and second joint-carriers connect in a jointed fashion to said first connection-joint, said apparatus further comprising a third formatting-part-element and a second guide-device, wherein said third formatting-part-element is separated from said second formatting-part-element by a second gap, wherein said second gap has a second-gap width, wherein said second guide-device connects to said second formatting-part-element, wherein said second guide-device connects to said third formatting-part-element, and wherein said second gap-width is adjustable.

2. The apparatus of claim 1, wherein said first guide-device has a camber that becomes narrower as said adjustable first-gap width is reduced.

3. The apparatus of claim 1, further comprising third and fourth joint-carriers, wherein said third joint-carrier is parallel to said first joint-carrier, and wherein said fourth joint-carrier is parallel to said second joint-carrier.

4. The apparatus of claim 1, wherein said first connection-joint comprises a rail carrier for guiding the first container-guide-rail.

5. The apparatus of claim 1, further comprising third and fourth joint-carriers, a second connection-joint, a third joint-element, and a fourth joint-element, wherein said third formatting-part-element is separated from said second formatting-part-element by a second gap, wherein said second gap has a second gap-width, wherein said second gap-width is adjustable, wherein said third joint-element connects said second formatting-part-element to said third joint-carrier, wherein said fourth joint-element connects said third formatting-part-element to said fourth joint-carrier, wherein said third and fourth joint-carriers are connected in jointed fashion to said second connection joint.

6. An apparatus for guiding containers in a container-treatment installation, said apparatus comprising a formatting part, wherein said formatting part comprises a first formatting-part-element, a second formatting-part-element, a first guide-device, a first container-guide rail, a first joint-element, a second joint-element, a first connection-joint, a first joint-carrier, and a second joint-carrier, wherein said second formatting-part-element is separated from said first formatting-part-element along a first direction, wherein said separation defines a first gap, wherein said first gap has an adjustable first-gap width, wherein said first guide-device is connected to said first and second formatting-part-elements, wherein said first guide-device comprises said first container guide-rail, said first and second joint-elements, said first and second joint-carriers, and said first connection-joint, wherein said first guide-device is configured such that adjustment of said first gap-width causes adjustment of said first container-guide-rail in a second direction, wherein said second direction is transverse to said first direction, wherein said first joint-element connects said first joint-carrier to said first formatting-part-element, wherein said second joint-element connects said second joint carrier to said second formatting-part-element, and wherein said first and second joint-carriers connect in a jointed fashion to said first connection-joint, said apparatus further comprising first and second rail-carriers and a second container-guide-rail, wherein said first connection-joint comprises said first and second first rail-carriers, wherein said first rail-carrier guides said first container-guide-rail, and wherein said second rail-carrier guides said second container-guide-rail.

7. The apparatus of claim 6, wherein said first guide-device has a camber that becomes narrower as said adjustable first-gap width is reduced.

8. The apparatus of claim 6, further comprising third and fourth joint-carriers, wherein said third joint-carrier is parallel to said first joint-carrier, and wherein said fourth joint-carrier is parallel to said second joint-carrier.

9. The apparatus of claim 6, wherein said first connection-joint comprises a rail carrier for guiding the first container-guide-rail.

10. The apparatus of claim 6, further comprising a third formatting-part-element, third and fourth joint-carriers, a second connection-joint, a third joint-element, and a fourth joint-element, wherein said third formatting-part-element is separated from said second formatting-part-element by a second gap, wherein said second gap has a second gap-width, wherein said second gap-width is adjustable, wherein said third joint-element connects said second formatting-part-element to said third joint-carrier, wherein said fourth joint-element connects said third formatting-part-element to said fourth joint-carrier, wherein said third and fourth joint-carriers are connected in jointed fashion to said second connection joint.

11. An apparatus for guiding containers in a container-treatment installation, said apparatus comprising a formatting part, wherein said formatting part comprises a first formatting-part-element, a second formatting-part-element, a first guide-device, a first container-guide rail, a first joint-element, a second joint-element, a first connection-joint, a first joint-carrier, and a second joint-carrier, wherein said second formatting-part-element is separated from said first formatting-part-element along a first direction, wherein said separation defines a first gap, wherein said first gap has an adjustable first-gap width, wherein said first guide-device is connected to said first and second formatting-part-elements, wherein said first guide-device comprises said first container guide-rail, said first and second joint-elements, said first and second joint-carriers, and said first connection-joint, wherein said first guide-device is configured such that adjustment of said first gap-width causes adjustment of said first container-guide-rail in a second direction, wherein said second direction is transverse to said first direction, wherein said first joint-element connects said first joint-carrier to said first formatting-part-element, wherein said second joint-element connects said second joint carrier to said second formatting-part-element, and wherein said first and second joint-carriers connect in a jointed fashion to said first connection-joint, said apparatus further comprising first and second rail-carriers, each of which is arranged in a horizontal plane with a vertical spatial interval between the horizontal planes therebetween, wherein said first container-guide-rail is arranged in a displaceable manner in said first rail-carrier.

12. The apparatus of claim 11, further comprising a third formatting-part-element, third and fourth joint-carriers, a second connection-joint, a third joint-element, and a fourth joint-element, wherein said third formatting-part-element is separated from said second formatting-part-element by a second gap, wherein said second gap has a second gap-width, wherein said second gap-width is adjustable, wherein said third joint-element connects said second formatting-part-element to said third joint-carrier, wherein said fourth joint-element connects said third formatting-part-element to said fourth joint-carrier, wherein said third and fourth joint-carriers are connected in jointed fashion to said second connection joint.

13. The apparatus of claim 11, further comprising third and fourth joint-carriers, wherein said third joint-carrier is parallel to said first joint-carrier, and wherein said fourth joint-carrier is parallel to said second joint-carrier.

14. The apparatus claim 11, wherein said first connection-joint comprises a rail carrier for guiding the first container-guide-rail.

15. The apparatus of claim 11, wherein said first guide-device has an inner camber that becomes narrower in its height as said adjustable first-gap width is reduced.

* * * * *